E. J. ANDREWS.
DYNAMO ELECTRIC MACHINE.
APPLICATION FILED JUNE 11, 1912.

1,261,999.

Patented Apr. 9, 1918.
3 SHEETS—SHEET 1.

Witnesses:
J. C. Devric.
W. G. Heilman

Inventor:
Ernest J. Andrews.
By George L. Chindahl
atty

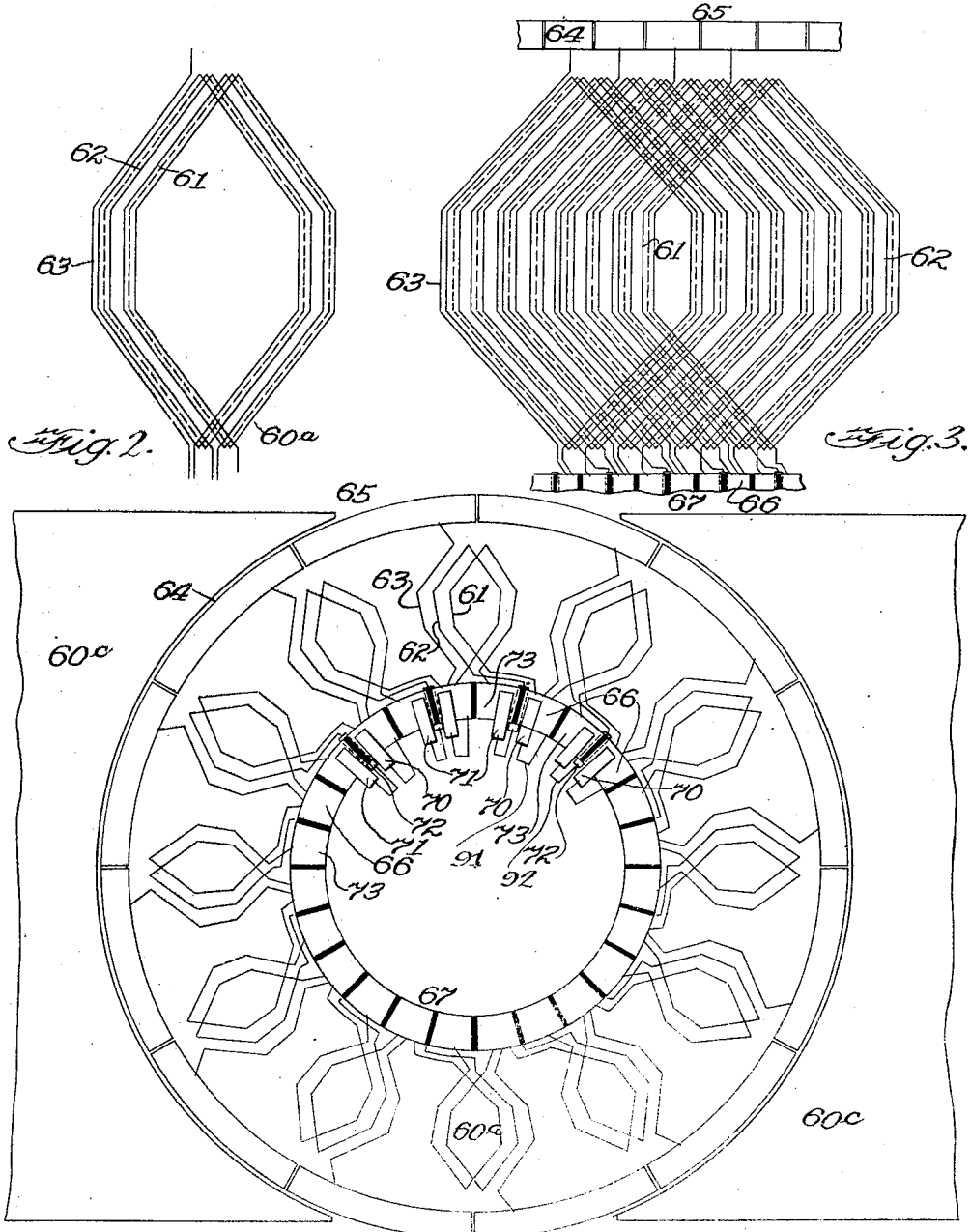

E. J. ANDREWS.
DYNAMO ELECTRIC MACHINE.
APPLICATION FILED JUNE 11, 1912.
1,261,999.
Patented Apr. 9, 1918.
3 SHEETS—SHEET 3.
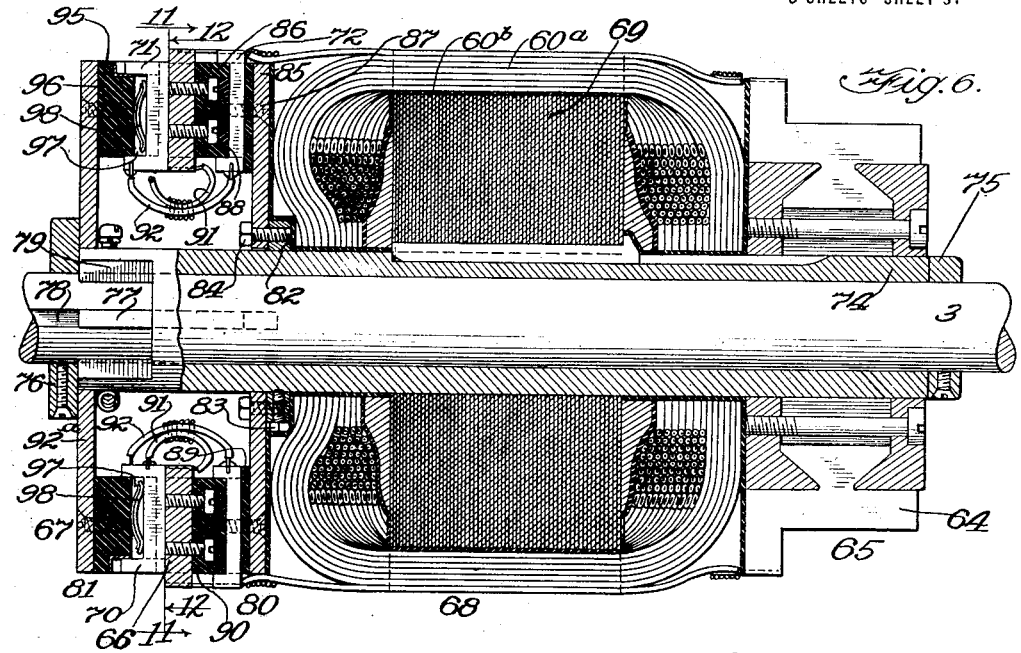
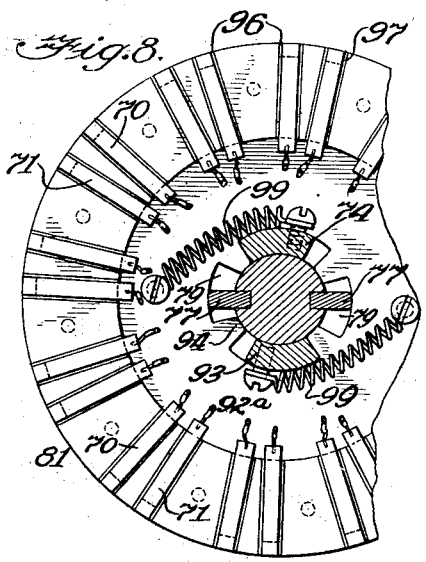
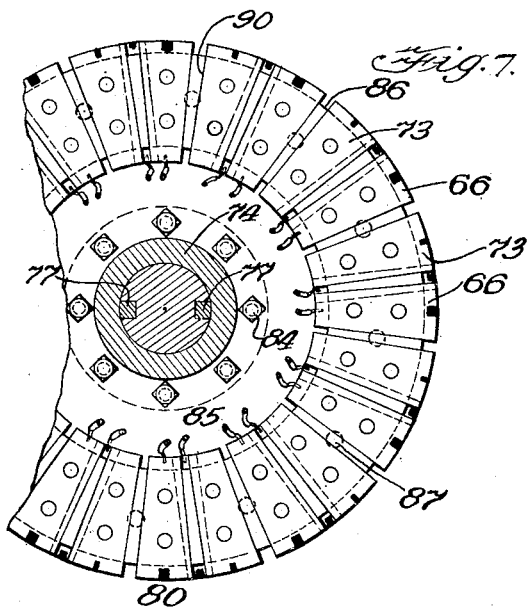
Witnesses:—
Urw. H. Yagle
Earl C. Carlson
Inventor
Ernest J. Andrews.
by George L. Chindahl
Atty.

UNITED STATES PATENT OFFICE.

ERNEST J. ANDREWS, OF CHICAGO, ILLINOIS, ASSIGNOR OF ONE-FOURTH TO GEORGE L. CHINDAHL, OF CHICAGO, ILLINOIS.

DYNAMO-ELECTRIC MACHINE.

1,261,999.  Specification of Letters Patent.  Patented Apr. 9, 1918.

Application filed June 11, 1912. Serial No. 702,955.

*To all whom it may concern:*

Be it known that I, ERNEST J. ANDREWS, a citizen of the United States, residing at Chicago, in the county of Cook and State of Illinois, have invented certain new and useful Improvements in Dynamo-Electric Machines, of which the following is a specification.

This invention relates to dynamo electric machines which may be used as motors for such purpose as starting internal combustion engines and also for generating current for storing energy in a storage battery; the battery to be used for running the machine as a motor, and, if desired, for ignition, lighting, and other purposes.

Engine starters of this nature have been produced, but it has been found that in order to produce sufficient power to start the engine, either the electric machine must be very large or else it must run at very high speed. If it is of high speed it becomes necessary to run the machine as a generator at a still higher speed in order to generate sufficient electromotive force. The use of the high speed machine is objectionable because it must be run at the highest speed as a generator during the greater portion of the time, and at the slower speed as a motor for but a few minutes a day; and the high speed not only produces more noise, but it is also much more injurious to the wearing parts of the machine.

One of the objects of this invention is to produce a dynamo-electric machine that, when run as a generator, will generate a much higher electromotive force than is required to run the machine as a motor at the same speed and with the same strength of field; so that when starting the machine may be run at a higher speed in order to supply sufficient power; and when generating sufficient electromotive force can be generated to supply the battery by running the machine at even a lower speed than when running at full load as a motor.

A further object is to provide improved mechanism for suitably carrying out the above mentioned objects of the invention.

Figure 1:
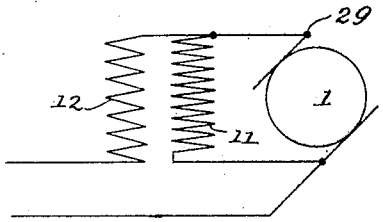
Figure 5:
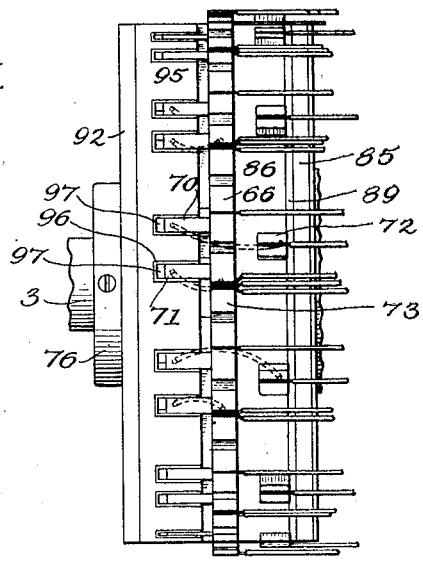

In the accompanying drawings, Figure 1 is a diagrammatic view of the machine and its field windings. Fig. 2 is a diagrammatic view of one of the coils in the armature. Fig. 3 is a diagrammatic view of a plurality of the coils showing the overlapping of same and the connections as on the armature. Fig. 4 is a diagrammatic view of all of the coils of the armature showing the connections of the coils with a circuit-changer which is used with the machine, and the connections between the circuit changer and the commutator of the armature. In this figure to avoid confusion the overlapping of the coils is not shown. Fig. 5 is a side elevation of the circuit changer. Fig. 6 is a longitudinal cross-section of an armature used including the circuit changer mounted thereon. Fig. 7 is a partial cross-section of the changer along the lines 11 11 of Fig. 6. Fig. 8 is a partial cross-section of the changer along the lines 12 12 of Fig. 6.

It is well understood by electricians that the electromotive force that will be generated by a generator is proportional to the number of turns of wires in series in each circuit in the armature. So that other conditions remaining the same, if the number of turns in series is doubled, the electromotive force generated will be doubled. In my invention I take advantage of this fact and have produced a machine so constructed that the number of turns in each circuit through the armature can be increased when it is desired to use the machine as a generator. So that the electromotive force generated will be sufficient to supply the battery without increasing the speed of the machine beyond the speed imparted to the machine by the battery similarly arranged when the machine is running at full load as a motor. In this instance, as an illustration of my invention, I double the number of turns in the circuits in the armature when the machine is used as a generator, and hence the electromotive force will be increased one hundred per cent., with similar speers and field strengths. And thus I am able to run the machine when generating on a weaker field, and also to run it at somewhat less speed and thus save energy and avoid much wear on the moving parts.

As an illustration of the manner in which my invention may be carried out, I have in this instance shown a two-pole machine which has twelve coils on the armature. It is to be understood, however, that the invention is not confined to this particular application. It may be applied to machines with a greater number of poles, or to armatures with a greater or lesser number of coils. Each of the coils is, in this instance, divided into two sections, and switching means are provided whereby these two sections in each coil may be thrown either in parallel or in series with each other. When the machine is to be used as a motor in starting or boosting the engine, the sections are automatically thrown in parallel, thus giving a high speed without decreasing the torque. So that by the use of suitable reduction gearing the torque on the engine shaft may be made sufficiently great. And when used as a generator the sections are automatically thrown in series thus giving the high electromotive force desired.

In order to give the greatest possible field strength and hence the maximum torque when starting or boosting, I provide the machine with a compound winding so arranged that the two windings are cumulative when starting; and hence the series winding materially strengthens the field. And this same winding with no change whatever, gives a differential winding when generating, as the series current is then reversed; and this allows a more nearly constant electromotive force to be generated, and also a more efficient field, because the series current when generating is very immaterial compared with the series current when starting, and the heating is thus materially reduced.

The electric machine 1 may consist of any suitable form of direct current machine. Herein I have selected a compound wound machine with a shunt field 11 and a series field 12, the fields being cumulative when the machine acts as a motor and differential when the machine acts as a generator. In this instance I have preferred a machine with two poles 60°, and with a drum, armature, Fig. 6, having twelve coils, as shown diagrammatically in Fig. 4. The coils 60$^a$ lie in the slots 60$^b$ of the core 69 of the armature in the usual manner, lapping on the other coils as indicated in Fig. 3. Any suitable number of turns in each coil may be provided for. Each of the coils I have divided herein into equal sections 61 and 62 (Fig. 2). In addition I have provided with each coil a wire 63 that connects each segment 64 of the commutator 65 with one of the alternate segments 66 of the circuit changing switch 67. This switch, or circuit-changer, is mounted on the shaft 3 of the armature 68 in the rear of the armature core 69. Fig. 2 shows diagrammatically one of the coils and the connecting wire. Fig. 3 shows a number of the coils substantially as they are arranged on the armature, and Fig. 4 shows the twelve coils connected to the commutator 65 and to the circuit changer 67.

When the machine acts as a motor the two sections of each of the coils are connected in parallel, but when the machine acts as a generator the two sections of each of the coils are connected in series. Fig. 4 also indicates the means by which these connections are made. The alternate movable contact pieces 70 are connected, as indicated, to the adjacent fixed segments 66 of the circuit-changer, while the other alternate movable contact pieces 71 are connected to the terminals of the coil sections 62 by means of the connecting bars 72. The other terminal of each of the coil sections 62 is connected to one of the fixed circuit changer segments 66 to which are also connected one end of the connecting wires 63. One of the terminals of each of the coil sections 61 is connected to one of the fixed segments 66 and the other to the adjacent fixed segment 73.

A consideration of these coils and connections will show that when the movable sections are in the position shown in Fig. 4 the coil sections will be connected in series with each other. When, however, the movable sections are shifted, one segment clockwise, the coil sections of each coil will be connected in parallel with each other. The former position is the position of the movable segments when the machine is acting as a generator, the latter position when the machine is driving the engine.

The circuit-changer and the means for operating it will now be described: The changer is mounted upon the rear end of the armature. The core 69 of the armature is fixed to a sleeve 74 mounted on the shaft 3 of the armature, being free to rotate thereon. A collar 75 at the front end of the armature fixed to the shaft 3, and a second collar 76, at the rear end of the armature, also fixed to the shaft 3, limit longitudinal movement of the sleeve on the shaft. A key 77 set in a slot 78, on each side of the shaft, projects into a slot 79 in the end of the sleeve, and thereby limits the rotational movement of the sleeve with reference to the shaft, to a portion of a complete rotation.

The circuit-changer 67 comprises a fixed member 80 and a movable member 81. The fixed member is attached to the sleeve 74 by means of a collar 82, the screws 83, and the screws 84 passing through the disk 85. An insulation ring 86 is attached to the disk 85 by means of screws 87. Embedded in slots 88 in this ring are connecting bars 72 for the purpose of connecting each one of the terminals of the armature coil sections 62 with one of the segments 71 of the movable member 81 of the changer. A ring 89 of insulation is inserted between the ring 86 and the disk 85 to prevent contact of the connecting bars 72 with the disk. Also embedded in the slots 90 of the ring are the contact segments 66 and 73. The upper end of each of these segments is also connected to certain terminals of the coil sections as hereinbefore described; and the lower end of each alternate section is connected to the movable segments 70 by connecting wires 91, and connecting wires 92 connect the bars 72 with the segments 71.

The movable member of the circuit changer comprises a disk 92$^a$ which is rotatably mounted upon the shaft 3, but is limited in its rotation in one direction by the projecting ends 93 of the sleeve coming in contact with projecting lugs 94 of the disk. And rotation is limited in the other direction by these lugs coming in contact with the keys 77 fixed in the shaft. Attached to this disk is an insulation ring 95 in which are slidably mounted the movable contact pieces 70 and 71 in the metallic casings 96 which are fixed in the slots 97 in the ring 95. These movable contact pieces are free to slide in the casings but are held closely in contact with the fixed contact pieces by means of the springs 98 positioned between the movable segments and the bottom of the slots in the insulation ring.

Normally the movable contacts 70 and 71, respectively, are in contact with the fixed contacts 66 and 73. In this position of the movable member of the circuit-changer the machine is connected with the two sections in each coil in series and is adapted to operate as a generator. When, however, the movable member 81 is moved clockwise, looking toward the circuit-changer end of the armature, or as shown in Fig. 4, so that each movable contact will be shifted to the adjacent right hand segment, the coil sections will be connected in parallel, and the machine will be adapted to operate as a motor.

The movable segments 71, as indicated in Figs. 4 and 5, are normally adjacent the right-hand edge of the fixed segments 73, and the movable segments 70 are normally adjacent the left-hand edge of the fixed segments 66; so that, as the shift occurs, the movable segments 71 will pass off from the fixed segments 73 before the movable segments 70 have come in contact with the fixed segments 73. In this manner, during the shifting of the movable member of the circuit-changer, the coils in the armature may have one-half of the sections shorted but the other half at the same time will be normal; so that at no time are all of the coil sections in the armature shorted.

The method of connecting the terminals of the coil sections to the various segments and connecting bars is clearly indicated in Fig. 4. The connecting wires may be tied together in bunches, as indicated in Fig. 6, so as to prevent any tendency of the wires to vibrate and break loose from the connecting ends.

It may be desired with some arrangements of the machine and engine, for example where the maximum speed of the machine when acting as a motor exceeds the minimum speed at which it may be desired to generate, to have springs 99 normally holding the movable member of the changer so that the machine will be in condition to generate. These springs, however, may be dispensed with, even under the arrangement of the machine and engine mentioned, and particularly if the maximum speed of the machine as a motor is as great as the minimum speed of the machine as a generator.

If it is desired to use the machine to start the engine the shaft of the armature of the machine is operatively connected, in any suitable manner, with the driving shaft of the engine through any suitable reduction gearing, and the machine, which is now to act as a motor, may be started in any suitable manner. The armature of the motor, will begin to rotate, and if the arrangements are as shown herein, the direction of rotation will be clockwise, looking toward the front or commutator end of the armature. The fixed member 80 of the circuit-changer will be rotated by the sleeve 74, carrying with it the movable member 81, until lugs 94 come in contact with keys 77, when the movable member will be rotated relatively to the fixed member into the motor-operating position, and the motor will cause the engine shaft to rotate. The motor will continue to boost the engine in this manner until the engine begins to run under its own power, and until the speed of the engine reaches some predetermined amount, depending upon the special arrangement of the reduction gearing, the number of turns of the coils of the armature, and other factors. The engine will then begin to drive the electric machine and the machine will then begin to generate as the machine shaft will be driven by the engine ahead of the sleeve 74 and the movable member of the circuit-changer will be rotated to the generating position.

It is to be understood that, although for the purpose of illustrating clearly my invention, I have described specific structure, yet various modifications therein may be made by those skilled in the art without departing from the scope of the invention.

I claim as my invention:

1. In a dynamo-electric machine, an armature comprising a plurality of closed armature coils, each of said coils comprising two adjacent sections, and means rotatable with said armature for changing the two sections of each of said coils from parallel to series relation.

2. In a dynamo-electric machine, an armature including a plurality of coils, each of said coils comprising a plurality of sections; a commutator fixed to one end of said armature; and a circuit-changer fixed to the other end of said armature, said changer adapted to change the sections of each of said coils from series to parallel relation.

3. In a dynamo-electric machine, an armature, the core of said armature having slots therein substantially parallel with the axis of said armature, a plurality of coils in said slots, each of said coils comprising two sections, and means movable with said armature for changing the series and parallel relation of the sections of each of said coils.

4. In a dynamo-electric machine, an armature, the core of said armature having slots therein, a plurality of coils in said slots, each of said coils comprising two sections, a commutator, and a circuit-changer stationary relative to said armature, wires connecting the segments of said commutator with contact pieces on said changer, the terminals of each of said sections being connected to said changer; and means for operating said changer.

5. In a dynamo-electric machine, an armature, a plurality of coils mounted on said armature, each of said coils comprising two sections, a commutator and a circuit-changer stationarily mounted with reference to said armature, one wire only connected to each segment of said commutator, the other end of said wire being connected to a segment of said circuit-changer, the terminals of said sections being connected to said changer.

6. In a dynamo-electric machine, an armature comprising a core, a commutator, and a circuit-changer, said core having a plurality of slots therein substantially parallel with the axis of said armature, a plurality of coils in said slots, each of said coils comprising two sections, one wire only connected to each segment of said commutator, the other end of said wire being connected to a segment of said circuit-changer, the terminals of said sections being connected to said changer, and means for operating said changer.

7. In a dynamo-electric machine, an armature comprising a core and a commutator on one side of said core, a circuit-changer fixed to the other side of said core, said core having a plurality of slots therein, and a plurality of coils in said slots, each of said coils comprising two sections, one wire only connected to each segment of said commutator, each of said wires being connected to the circuit-changer, the terminals of said sections being connected to said circuit-changer, and means for operating said changer.

8. In a dynamo-electric machine, an armature comprising a plurality of armature coils, each of said coils comprising two adjacent sections, a circuit-changer stationary relative to said armature, the terminals of each of said sections connected to said changer, and means for operating said circuit-changer.

9. In a dynamo-electric machine, an armature comprising a plurality of armature coils, each of said coils comprising two sections, an armature circuit-changer mounted on the shaft of said armature, and means for operating said circuit-changer, said means comprising a sleeve mounted on said shaft and free to rotate thereon for a portion of a complete rotation, said sleeve fixed to the core of said armature, and one member of said changer fixed to said sleeve and another member connected with said shaft.

10. In a dynamo-electric machine, an armature comprising a plurality of armature coils, each of said coils comprising two sections, and a circuit-changer comprising a disk fixed with relation to the core of said armature, and a second disk movable relative to said first mentioned disk, each of said disks having electric contact pieces thereon, the pieces on said fixed disk being connected with certain of the terminals of said sections.

11. In a dynamo-electric machine, an armature comprising a plurality of armature coils, each of said coils comprising two sections, a circuit-changer comprising a disk fixed with relation to the core of said armature, and a second disk movable relative to said first mentioned disk, each of said disks having electric contact pieces thereon, said pieces on said fixed disk connected with certain of the terminals of said sections, and means for rotating said disks relative to each other.

12. In a dynamo-electric machine, an armature comprising a plurality of armature coils, each of said coils comprising two sections, and a circuit-changer comprising a disk fixed with relation to the core of said armature and a second disk movable relative to said first mentioned disk, each of said disks having electric contact pieces thereon, said pieces on said fixed disk being connected with certain of the terminals of said sections, and each of the contact pieces on one of said disks being at all times in contact with one of the contact pieces on the other disk.

13. In a dynamo-electric machine, an armature comprising a plurality of armature coils, a circuit-changer comprising a disk fixed with relation to the core of said armature and a second disk movable relative to said first disk, each of said disks having electric contact pieces thereon, said pieces on said first disk being connected with certain of the terminals of said sections, each of the contact pieces on one of said disks being at all times in contact with one of the contact pieces on the other disk, and means for rotating one of said disks with relation to the other.

14. In a dynamo-electric machine, a shaft and an armature comprising a core and a plurality of coils, said core being mounted on said shaft and free to rotate thereon, a circuit-changer comprising two disks, one of said disks being fixed with relation to said core and the other being operatively connected with said shaft, and contacts on said disks, the contacts on said fixed disk being connected to the coils of said armature, and each of the contacts on one disk being at all times in contact with one of the contacts on the other disk.

15. In a dynamo-electric machine, a shaft and an armature comprising a core and a plurality of coils, said armature being mounted on said shaft, and means for changing the arrangement of the circuits of said armature, said means being operated by the relative rotations of said shaft and said core.

16. In a dynamo-electric machine, a shaft, an armature comprising a core and a plurality of coils, said core being rotatively mounted on said shaft, and means for varying the number of circuits in said armature, said means being operated by the limited relative rotations of said shaft and said core.

17. In a dynamo-electric machine, a shaft, an armature core mounted on said shaft and a plurality of coils mounted on said core, each of said coils comprising a plurality of sections, means for varying the number of sections in series, said means being operated by the relative rotation of said shaft and said core.

18. In a dynamo-electric machine, a shaft, an armature core mounted on said shaft, and a plurality of coils mounted on said core, each of said coils comprising two sections, and means for changing the said sections in each of said coils from series to parallel relation, said means being operated by the relative rotation of said shaft and said core.

19. In a dynamo-electric machine, a shaft, an armautre core mounted on said shaft, and a plurality of coils mounted on said core, each of said coils comprising two sections, means for changing the said sections in each of said coils from series to parallel relation, said means being operated by the relative rotation of said shaft and said core, and yielding means resisting the changing of said sections.

20. In a dynamo-electric machine, a shaft, an armature core mounted on said shaft, and a plurality of coils mounted on said core, each of said coils comprising two sections, means for changing the said sections in each of said coils from series to parallel relation, said means being operated by the relative rotation of said shaft and said core, and means including said changing means tending to change said sections from parallel to series relation.

21. In a dynamo-electric machine, a shaft, an armature core mounted on said shaft, and a plurality of coils mounted on said core, each of said coils comprising two sections, means for changing the said sections in each of said coils from series to parallel relation, said means being operated by the relative rotation of said shaft and said core, and yielding means resisting the said changing of said sections and tending to return said sections back to series relation.

22. A dynamo-electric machine adapted to be operated as a generator or as a motor, the armature of said machine comprising a core rotatably mounted on the shaft of said machine, and a circuit-changer connected to the coils of said armature and comprising two members, one of said members connected to said shaft, and the other member connected to said core, and means for limiting the amount of rotation of said core on said shaft.

23. In a dynamo-electric machine, a shaft, an armature comprising a core rotatably mounted on said shaft, and means for varying the number of circuits through said armature, said means being operated by the limited relative rotation of said shaft and said core.

24. In a dynamo-electric machine adapted to be operated as a generator or as a motor, the armature of said machine comprising a core rotatably mounted on the shaft of said machine, means for limiting the amount of rotation of said core on said shaft, and means for varying the number of circuits through said armature, said means being mounted on said shaft and being operated by the relative rotations of said shaft and said core.

25. A dynamo-electric machine adapted to be operated as a generator or as a motor, the field of said machine having compound windings, the armature of said machine comprising a core rotatably mounted on the shaft of said machine, when said armature shaft is driven by said core the number of circuits through said armature being less than when said core is driven by said shaft.

26. A dynamo-electric machine adapted to be operated as a generator or as a motor, the field of said machine having compound windings, the armature of said machine comprising a circuit changer, a core rotatably mounted on the shaft of said machine, the relative rotation of said shaft and said core operating said changer, when said shaft is driven by said core the said field windings being coumulative.

27. A dynamo-electric machine adapted to be operated as a generator or as a motor, the field of said machine having compound windings, the armature of said machine comprising a core rotatably mounted on the shaft of said machine, means for changing the number of circuits through said armature, said means being operated by the relative rotation of said shaft and said core, when said shaft is driven by said core the said field windings being cumulative, and the number of circuits through said armature being less than when said core is driven by said shaft.

28. In a dynamo-electric machine, an armature comprising a plurality of drum-wound coils, one commutator only, and a circuit-changer adapted to vary the number of circuits through said armature; the two terminals of each of said coils being at all times electrically connected with adjacent segments of said commutator.

29. In a dynamo-electric machine, an armature comprising a plurality of drum-wound coils, a single commutator, a circuit changer, the two terminals of each of said coils being at all times electrically connected with adjacent segments of said commutator, and means for operating said changer so as to vary the number of circuits through said armature.

30. In a dynamo-electric machine, an armature comprising a plurality of coils, a commutator, and a circuit changer, each of said coils comprising a plurality of sections, the terminals of each of said coils being at all times electrically connected with adjacent segments of said commutator, and all of the terminals of said sections being connected to said circuit changer.

31. In a dynamo-electric machine, an armature comprising a plurality of coils, a commutator, and a circuit changer, each of said coils comprising a plurality of sections, the terminals of each of said coils being at all times electrically connected with adjacent segments of said commutator, and means including said circuit changer for increasing the number of coil sections in series in the circuits of said armature.

32. In a dynamo-electric machine, an armature consisting of a core and a plurality of drum-wound coils, a commutator, the terminals of each of said coils being at all times connected to adjacent commutator segments, and means for varying the number of circuits through said armature.

33. In a dynamo-electric machine, an armature comprising a plurality of coils, a commutator, and a circuit changer, each of said coils comprising a plurality of sections, both terminals of all of said sections directly connected only to said circuit changer, and a single wire connecting each of the segments of said commutator with said changer.

34. In a dynamo-electric machine, an armature comprising a plurality of coils, a commutator, and a circuit changer, each of said coils comprising a plurality of sections, the terminals of said sections being connected directly to said changer, and one of the terminals of each of said coils being connected to a segment of said changer which is directly connected by a wire to a segment of said commutator.

35. In a dynamo-electric machine, an armature comprising a plurality of coils, a commutator, and a circuit changer, one of the terminals of each coil being connected to a segment of said changer to which is connected one of the terminals of an adjacent coil and which is connected to a segment of said commutator.

36. In a dynamo-electric machine, an armature having a plurality of coil sections, a shaft, a circuit-changer adapted to change the series and parallel relation of said sections, and means for operating said changer, said means comprising a sleeve mounted on said shaft, one member of said changer fixed to said sleeve and another member connected with said shaft; said armature being non-rotatably mounted on said sleeve.

37. In a dynamo-electric machine, an armature having a plurality of coils, a shaft, and a circuit-changer; said circuit-changer comprising a disk stationary relative to the core of said armature, and a second disk fixed to said shaft; said core being rotatably mounted on said shaft.

38. In a dynamo-electric machine, an armature and an armature circuit changer, said changer comprising two members movable relative to each other, a plurality of electrical contacts on each of said members, each of said contacts on one member being at all times in contact with a contact on the other member.

In testimony whereof I affix my signature in the presence of two witnesses.

ERNEST J. ANDREWS.

Witnesses:
 JOSEPH R. BARSE, Jr.,
 EARL C. CARLSON.

Copies of this patent may be obtained for five cents each, by addressing the "Commissioner of Patents, Washington, D. C."